3,425,820
HERBICIDAL COMPOSITION

Kaiji Kawai and Tadashi Hisada, Tokyo, and Nobuo Ishimoto, Kanagawa, Japan, assignors to Hodogaya Chemical Co., Ltd., Tokyo, Japan, a corporation of Japan
No Drawing. Filed Mar. 21, 1966, Ser. No. 535,701
U.S. Cl. 71—106
Int. Cl. A01n 9/20, 9/34

2 Claims

ABSTRACT OF THE DISCLOSURE

The present disclosure provides the novel composition for inhibiting or eradicating undesired brush, other woody plants and weeds growing in field, which composition contains as active ingredient 3,4-dichloropropionanilide in combination with a specified organic carbamate compound and methods of using such compositions.

---

This invention relates to a novel composition which displays selective herbicidal action such as withering and controlling undesired weeds and miscellaneous wild trees in a mixed population with crop plants without deleterious effect on the latter.

Heretofore, various kinds of herbicide have been provided for killing undesired, woody plant species and grassy weeds, most of which, however, are indiscriminate plant-killers and there are no chemicals which possess true selective herbicidal action on certain specified plants. The following chemicals are examples of chemicals, which at present are commercially available and widely used for combatting brush, woody plants and weeds grown in a cropped area such as a nursery garden, orchard, tea-tree garden and the like.

2,4-dichlorophenoxy acetic acid (2,4-D)
2,4,5-trichlorophenoxy acetic acid (2,4,5-T)
2-chloro-4,6-bis(ethylamino)-1,3,5-triazine (Simazine)
Ammonium sulfamate
Trichloroacetic acid
Sodium chlorate
Sodium cyanate.

It is known that all of these chemicals apparently bring about undesired phyto-toxic effect on the cultivated plants. 2,4-D and 2,4,5-T, for example, inhibit development of the terminal bud of the growing plants and show a tendency to cause monstrosity. Chemicals such as sodium cyanate and ammonium sulfamate, when utilized for the purpose of withering or defoliation of undesired plants, are often accompanied by yellowing, burning and defoliation of the leaves of the crop plants due to an accidental contact with the chemicals. A special precaution is therefore needed in the utilization of these chemicals, in order to prevent from the above-mentioned hazard. Thus, the chemicals are usually applied taking advantage of a difference between the height of the crop plant and that of the weeds or of a difference between the depths in soil at which the roots of the crop plants and weeds spread, so that the chemicals applied are not brought directly into contact with the leaves or roots of the crop plants. Actually, depending on the variable environmental circumstances, such as a proper configuration of the ground, weather and the like, the spraying of these chemicals is always confronted with a certain difficulty.

Thus, even though the chemicals were once applied successfully, a risk of injurious effect of the chemicals on the crop plants would not necessarily be obviated depending on the variables such as nature of the soil (soil class and soil system), a proper configuration of the ground, or quantity of the rainfall and so on.

Such chemicals are required, which do not show any harmful effect on the useful crop plants such as, for example, *Cryptomeria japonica* (Japanese Cryptomeria), *Chamaecyparis obtusa* (Japanese cypress), *Citrus unshiu* (Satsuma orange), *Camellia sinensis* (tea) and so on, but possess a really selective herbicidal activity against undesired woody plants and grassy weeds, such as *Acer crapinfolium* (Hornbeam maple), *Quercus serrata* (oak), *Rubus crataegifolius* (bramble), *Rhododendron kaempferi* and the like. If this were the case, the chemicals might be sprayed effectively throughout a specious afforested field of above-mentioned crop plants by means, for example, aircraft sprayer or any other sprayer of a large capacity without difficulty.

Now, it has surprisingly been found as a result of an extensive investigation which had been carried out by the present inventors, a new herbicidal composition which satisfies the aforementioned requirements.

The new composition of the present invention is a composite toxicant which is particularly useful for selective control of undesired brush, other woody plants and grassy weeds, spontaneously growing in a field in which crop trees are planted. The particular composition of the present invention contains as active ingredient 3,4-dichloropropion anilide (DCPA) and a carbamate compound selected from the group consisting of 1-naphthyl N-methyl carbamate and 2-naphthyl N-methyl carbamate.

By the so-called "field in which crop trees are planted" hereinabove-mentioned is meant, for instance, an afforesting area, nursery garden, orchard and so on.

The known herbicides nowadays utilized, as already pointed out, show more or less a selective killing action toward a variety of plant species. They however are lacking in a decisive herbicidal activity on a particular kind of undesired plant species. It is therefore surprising that the novel composition of the present invention has an extraordinarily strong and selective herbicidal activity against undesired weeds and woody plants while they do not display any injurious phyto-toxicity on a particularly specified plant species hereinunder mentioned. In this connection, it has been found that the penetration of a chemical into epidermal system of a living plant is considerably influenced not only by the particular characteristics of the chemical encountered by also by the conditions of epidermal system (cuticle, epidermal walls and the walls of the substomatal chambers) of the expanded leaves or the stems that come into contact with the chemical. It is noteworthy that DCPA, which constitutes one of the active ingredients of the composition of the present invention, shows a very peculiar selectivity as herbicide toward a certain species of vegetation. And indeed, this is partly due to the fact that the compound has a high solubility in a polar solvent on the one hand, and a poor solubility in a non-polar solvent on the other, and partly due to the fact that the specified crop plants to be treated secrete a certain waxy substance on their epidermal systems of trunk, stems and/or leaves.

Furthermore, it is surprising that with the composition of the present invention, an enhanced herbicidal activity is obtained owing to a notable synergistic effect resulting from a concurrent use of DCPA and the specified carbamate compound as active ingredients. In this respect, it is particularly noted that no appreciable enhancement in the phyto-toxicity is observed when the composition is applied to conifer trees or a certain kind of evergreens which secrete a waxy substance on their epidermal systems. This is for the reason that the penetratability of DCPA into the systems of the plants is not materially affected due to the coexistence of the carbamate compound in the composition.

The excellent selectivity and synergistic activity as herbicide presented by the composition of the present invention are well acknowledged by the following tests.

TEST I

Determination of the selectivity as herbicide

The test was carried out by using the following two stock solutions:

|  | Stock solution (parts) | |
|---|---|---|
|  | I | II |
| DCPA | 25 | 25 |
| 1-naphthyl-N-methyl carbamate (NMC) | — | 5 |
| Polyoxyethylene-nonylphenol ether | 5 | 5 |
| Calcium dodecylbenzene sulfonate | 5 | 5 |
| Mixture of equal volumes of isophorone and xylene | 65 | 60 |

The stock solutions were separately diluted with water to give aqueous emulsions each of which contains one per cent by weight of the active ingredient.

The diluted aqueous emulsions were separately applied to a series of various plants by a micro sprayer in an amount sufficient to wet the foliage of the plants. 30 days after the sprayings, a visual inspection was performed. The results obtained were rated according to the following designations:

| **** | Extreme injury. |
|---|---|
| *** | Severe injury. |
| ** | Moderate injury. |
| * | Slight injury. |
| – | No injury. |

The data obtained are set forth in the following Table I.

TABLE I

| Scientific name | Common name | DCPA | DCPA + NMC |
|---|---|---|---|
| Larix leptolepis | Larch | *** | **** |
| Quercus myrsinaefolia | Oak | ** | *** |
| Shiia sieboldii | | ** | **** |
| Platanus acerifolia | Plane tree | ** | *** |
| Prunus yedoensis | Cherry | * | ** |
| Eriobotrya japonica | Loquat | * | * |
| Rhododendron indicum | Rose bay | ** | *** |
| Rhododendron pulchrum | | ** | ** |
| Euonymus japonicus | Spindle tree | * | * |
| Ficus carical | Fig tree | *** | **** |
| Ligustrum ovalifolium | Privet | ** | *** |
| Firmiana platanifolia | Phoenix tree | ** | *** |
| Semiarundinaria fastuosa | | *** | *** |
| Acer crapinfolium | Hornbeam maple | ** | *** |
| Licium chinense | Chinese Matrimony vine | **** | **** |
| Ginkgo biloba | Maiden hair tree | * | ** |
| Rubus crataegifolius | Bramble | *** | *** |
| Vitis labrusca | Grape | *** | *** |
| Pinus densiflora | Pine | – | – |
| Cedrus deodara | Himalayan cedar | – | – |
| Cryptomeria japonica | Japanese cryptomeria | – | – |
| Chamaecyparic obtusa | Japanese cypress | – | – |
| Juniperus chinensis | Juniper | – | – |
| Camellia japonica | Camellia | – | – |
| Camellia sinensis | Tea | – | – |
| Ternstoremia japonica | | – | – |
| Aucuba japonica | Japanese aucuba | – | – |
| Viburnum awabuki | Viburnum | – | – |
| Ilex crenata | Holley | – | – |
| Torreya nucifera | Torreya | – | – |
| Fatsia japonica | | – | – |
| Lithocarpus edulis | | – | – |
| Citrus unshiu | Satsuma orange | – | – |
| Citrus kinokuni | Kinokuni mandarine | – | – |
| Citrus aurantiacum | Sour orange | – | – |
| Citrus natsudaidai | | – | – |

Thus, it can be seen from Table I that the plants tolerant to DCPA were also tolerant to the composition of the present invention and if not so, the same or almost the same phyto-toxicities, such as yellowing, burning and/or defoliation were observed in both cases.

TEST II

Determination of synergistic activity

The stock solutions I and II prepared in accordance with same fashion as in Test I and a third stock solution III which contains 1-naphthyl-N-methyl carbamate alone as the active ingredient were separately diluted with water to give aqueous emulsions each of which contains 0.5% by weight of the active ingredient.

1500 liters per hectare of each of the emulsions were separately applied with a sprayer to the plants at the different stages of growth. 20 days after the applications, the results were inspected visually and tabulated in Table II with the rates of the designations following.

TABLE II

| Scientific name | Common name | Height (cm.) | DCPA | NMC | DCPA+ NMC |
|---|---|---|---|---|---|
| Digitaria abscendens | Crab grass | 5–10 | x | * | x |
| | | 15–20 | **–* | – | x |
| | | 40–50 | * | – | x |
| Panicum crusgalli | Barnyard grass | 5–10 | x | * | x |
| | | 15–20 | * | – | x |
| | | 40–50 | – | – | x–**** |
| Alopecuraus aequalis | Dent foxtail | 5–10 | *** | – | x |
| | | 20–25 | * | – | x–**** |
| Setaria virdis | Foxtail grass | 5–10 | x | * | x |
| | | 15–20 | *** | – | x |
| | | 50–60 | * | – | x |
| Erigeron canadensis | Hog weed | 5–10 | *** | – | x |
| | | 70–80 | ** | – | x–**** |
| Polygonum persicaria | Red legs | 5–10 | x | * | x |
| | | 20–30 | ** | – | x |

| x | Withering. |
|---|---|
| **** | Extreme injury. |
| *** | Severe injury. |
| ** | Moderate injury. |
| * | Slight injury. |
| – | No injury. |

It is seen from Table II that DCPA singly acts as an excellent selective herbicide against most of the plants so far as the plants under test are at the early stage of growth such as from two (2) to four (4) leaf stages or at approximate 10 cm. tall. The activity however gradually weakens as the progression of the growth of the plants and when the height of the plants reaches 20 cm. or more, the activity is almost none. On the other hand, the carbamate compound per se, as is noted is almost useless as herbicide. In spite of that, the activity of DCPA is extremely enhanced as the result of a synergistic action when DCPA is mixed with about 20 percent by weight of the carbamate compound, in accordance with the present invention.

As can be seen from the above explanation, the selective activity of the herbicide of the present invention is largely affected by the condition of the leaf of the plant to be treated, and that the extraordinary herbicidal activity of the compound of the present invention is caused by synergistic effect presented by a concurrent use of DCPA and the specified carbamate compound.

The composition of the present invention can advantageously be utilized for combatting undesired weeds and plants spontaneously grown in the fields particularly those hereinunder mentioned rather than a primeval forest in which a vegetation of various plant species coexistently overgrow, since with the selective phyto-toxicant activity shown by the composition of the present invention, a satisfactory control of the unlimited plant species in the virgin forest cannot be attained.

The plantation fields for crop which are contemplated for treatment with the particular composition of the present invention are:

(a) Field afforested with Japanese cryptomeria, Japanese cypress and the like as well as the nursery garden thereof, (b) Orchard, for example, Satsuma orange- and Kinokuni mandarine-gardens and their nursery gardens, (c) Tea-tree garden such as Camellia tea, (d) Pine-apple garden.

Although the selective activity presented by the composition of the present invention as aforementioned depends essentially on the epidermal system's condition of the leaf of a given plant, the actual tolerance of the leaves to the composition is not equal but different, largely depending on the extent of the development thereof. More precisely, young and fresh leaves of the given plant at a relatively short time after their sprout in which the cuticle did not sufficiently develop, generally possess a relatively poor tolerance as compared with that shown by the leaves which are in a performance of development.

Taking into consideration the above-mentioned fact, it is desirable and recommendable to apply the composition of the present invention to the plants in a season of June to October at which time all plants grow lively.

The composition of the present invention may be provided in the forms of a formulation of emulsifible concentrate, and in particular a formulation of wettable powder, a dusting preparation, and an aerosol preparation in combination with a gasifying propellant. They are readily prepared in accordance with a conventional procedure similar to those used in the known preparations to be employed for agricultural purposes.

The new toxicant preparation of the present invention may advantageously be applied to an area of 10 ares of a ground in a diluted preparation which generally contains 100–1000 grams of 3,4-dichloropropionanilide (I) and 10–300 grams of the specified carbamate compound (II), the suitable concentrations of the compounds in the preparation being chosen depending on a configuration of the ground to be applied such as, for example, planting fields, orchards and nurseries; methods employed in the application; the formulation of the preparation and the like.

The relative amounts of the compounds (I) and (II) to be employed for obtaining a composition of the present invention may generally vary within the range of 1 part by weight of the former compound and 0.05–3 parts by weight of the latter. However, it should be brought to mind that a satisfactory synergistic effect, with respect to the selective herbicidal activity of the compound, according to the present invention, can be obtained even at a relative concentration of 1 part by weight of the compound (I) and 0.005–0.5 part by weight of the compound (II).

The following examples are illustrative of the invention.

EXAMPLE I

A stock solution was prepared by dissolving 25 parts of 3,4-dichloropropion anilide, 7.5 parts of 1-naphthyl-N-methyl carbamate, 6 parts of polyoxyethylene octyl phenol ether and 6.5 parts of calcium dodecylbenzene sulfonate into 55 parts of a mixed solvent consisting of equal amounts of isophorone and xylene, all of the parts being by weight.

The stock solution thus obtained was diluted with water to give an aqueous emulsion containing 0.6 percent by weight of the DCPA and which was applied on July 10th to a mandarine-grass orchard.

150 liters of the aqueous emulsion per 10 ares of the orchard, well grown over the grasses (*Digitaria adscendens*), were sprayed thoroughly. The height of the grasses was about 50–60 cm. 15 days after the application, a visual inspection was made and confirmed that the grasses over the ground had been completely withered, while the mandarine trees of the species of *Citrus unshiu* (Satsuma orange) of the fifteen annual age are not affected.

EXAMPLE II

A highly satisfactory result was obtained by employing the aqueous emulsion of Example I to combatting weeds overgrown in a nursery garden of mandarine trees.

Since the height of the young trees of the mandarine and the height of the weeds in the nursery garden were very close, a very special herbicide was required in this particular case, which should have a severe selectivity in herbicidal action capable of killing only the weeds without injurious effect on the mandarine trees. Under the critical circumstances, most of the known herbicides, particularly the herbicides to be employed for the purpose to attack the stem and leaf of the undesired plants, were useless for a rough and indiscriminate spraying of the vegetation in the garden.

A comparison test was carried out in the following fashion in order to prove the selective herbicidal activity of the composition of the present invention as compared with those of the hitherto known foliage herbicides as control.

The stock solution prepared in Example II was diluted with water to give an aqueous emulsion which contains 0.6 percent by weight of the DCPA originally presented.

100 liters of the emulsion were sprayed on July 1st, roughly over 10 ares of the nursery. In the control tests, 100 liters of each of the aqueous solutions which contains respectively one of the known toxicants, namely, sodium cyanate, Diquat (1,1-ethylene-2,2'-dipyridylium dibromide) and cacodylic acid, at the designated concentration, were sprayed in the similar manner in the separate area of the garden. The nurselings of the mandarine trees and the weeds in a mixed growth in the garden were as follows—

Nurselings: *Citrus unshiu* (Satsuma orange); *Citrus kinokuni* (Kinokuni mandarine); *Citrus natsudaidai*; *Citrus hassaku*.

All of the above were of third annual age.

Weeds: *Digitaria adscendens* (crabgrass) at the height of 20–30 cm.; *Gnaphalium affine* (cud weed) at the height of 20–25 cm.; *Pimellia ternata* at the height of 10–15 cm.

30 days after the treatments, the effects were visually inspected. The results obtained are given in Table III.

TABLE III

| Herbicide | Active agent applied, gr./10 ares | Herbicidal effect on weeds | Phyto-toxity on nurseling |
| --- | --- | --- | --- |
| Composition of the present invention | 600 | 5 | – |
| Sodium cyanate | 3,000 | 3 | x-**** |
| Diquat | 70 | 5 | **** |
| Cacodylic acid | 1,000 | 4 | x |

The herbicidal effect and phyto-toxicity shown in the above table were rated according to the fololwing designations.

(a) Herbicidal effect on the weeds:

5 ———————————— Death.
4 ———————————— Severe injury.
3 ———————————— Moderate injury.
2 ———————————— Slight injury.
1 ———————————— Very slight injury.
0 ———————————— No effect.

(b) Phyto-toxicity on the nurseling:

– ———————————— Non-toxicity.
 x ———————————— Withered.
**** ———————————— Severe injury.
*** ———————————— Moderate injury.
** ———————————— Slight injury.
* ———————————— Very slight injury.

EXAMPLE III

*Cyperus microria* (nustsege) and *Digitaria adscendens* (crabgrass) at the height of about 20–30 cm. tall which overgrown in a *Camellia senensis* (tea) garden was sprayed on the 5th of July by a knapsack sprayer with 150 liters per 10 are of an aqueous suspension containing 1.5 kg. of DCPA and 0.3 kg. of 2-naphthyl-N-methyl carbamate the active ingredient. The aqueous suspension had been prepared by diluting a wettable powder formulated according to the present invention as follows:

| | Parts by weight |
|---|---|
| 3,4-dichloropropion anilide | 50 |
| 2-naphthyl-N-methyl carbamate | 10 |
| Sodium lignosulfonate | 8 |
| Talc | 32 |

30 days after the treatment, it was found that most of the weeds were destroyed almost completely, while no harmful effect was observed on the *Camellia sinensis*.

What we claim is:

1. A herbicidal composition for inhibiting and eradicating undesired vegetation which contains as active ingredient an effective amount of a mixture consisting of (1) 1 part by weight of 3,4-dichloropropionanilide and (2) 0.005–3 parts by weight of a carbamate selected from the group consisting of 1-naphthyl N-methyl carbamate and 2-naphthyl N-methyl carbamate.

2. A process for selectively controlling the growth of the undesired woody plants and weeds which comprises applying a herbicidally effective amount of a composition which contains as active ingredient a mixture consisting of (1) 1 part by weight of 3,4-dichloropropionanilide and (2) 0.005–3 parts by weight of a carbamate selected from the group consisting of 1-naphthyl N-methyl carbamate, and 2-naphthyl N-methyl carbamate.

References Cited

UNITED STATES PATENTS

| 2,776,196 | 1/1957 | Gysin et al. | 71—111 |
| 3,134,666 | 5/1964 | McRae | 71—118 |
| 3,140,167 | 7/1964 | Haubein | 71—106 |
| 3,154,398 | 10/1964 | McRae | 71—118 |

LEWIS GOTTS, *Primary Examiner.*

C. L. MILLS, *Assistant Examiner.*

U.S. Cl. X.R.

71—118